(12) United States Patent
Wall et al.

(10) Patent No.: US 12,731,885 B1
(45) Date of Patent: Sep. 8, 2026

(54) SLANTED TOP LOADED MONOPOLE FOR VLF GENERATION

(71) Applicant: HRL Laboratories, LLC, Malibu, CA (US)

(72) Inventors: Walter S. Wall, Calabasas, CA (US); Carson R. White, Agoura Hills, CA (US); Christopher P. Henry, Thousand Oaks, CA (US); Hyok J. Song, Oak Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 676 days.

(21) Appl. No.: 17/987,715

(22) Filed: Nov. 15, 2022

Related U.S. Application Data

(62) Division of application No. 16/863,789, filed on Apr. 30, 2020, now Pat. No. 11,539,119.

(Continued)

(51) Int. Cl.
*H01Q 1/30* (2006.01)
*B64C 39/02* (2023.01)

(Continued)

(52) U.S. Cl.
CPC ............ *H01Q 1/30* (2013.01); *B64C 39/022* (2013.01); *B64F 3/02* (2013.01); *B64U 10/60* (2023.01);

(Continued)

(58) Field of Classification Search
CPC .. H01Q 1/30; H01Q 1/34; H01Q 1/18; H01Q 9/36; B64U 70/90; B64U 10/60; B64U 2101/20; B64C 39/022; B64F 3/02
See application file for complete search history.

(56) References Cited

U.S. PATENT DOCUMENTS 2,417,191 A * 3/1947 Fox .......................... H03J 7/16
455/107
2,629,115 A 2/1953 Hansen
(Continued)

FOREIGN PATENT DOCUMENTS

EP 2728666 5/2014
GB 2329761 A * 3/1999 ............ H01Q 1/288

OTHER PUBLICATIONS

From U.S. Appl. No. 16/863,789 (now U.S. Pat. No. 11,539,119), Notice of Allowance mailed on Aug. 24, 2022.
(Continued)

*Primary Examiner* — Andrew J Triggs
(74) *Attorney, Agent, or Firm* — Ladas & Parry, LLP

(57) ABSTRACT

A system for an antenna for very low frequency communication includes a surface platform that is configured to move on a surface or to be stationary on the surface, a first conductive cable having a first end coupled to the surface platform, wherein the first conductive cable is electrically conductive, and an aerial platform coupled to a second end of the first conductive cable, wherein the aerial platform comprises an electrically conductive portion electrically coupled to the first conductive cable, wherein for a moving surface platform the aerial platform is towed and has an elevation above the surface, and wherein for a stationary surface platform the aerial platform flies an orbital path above the surface platform.

9 Claims, 9 Drawing Sheets

Related U.S. Application Data

(60) Provisional application No. 62/869,838, filed on Jul. 2, 2019.

(51) Int. Cl.
*B64F 3/02* (2006.01)
*B64U 10/60* (2023.01)
*B64U 101/20* (2023.01)
*H01Q 1/18* (2006.01)
*H01Q 9/36* (2006.01)

(52) U.S. Cl.
CPC ................ *H01Q 1/18* (2013.01); *H01Q 9/36* (2013.01); *B64U 2101/20* (2023.01)

(56) References Cited

U.S. PATENT DOCUMENTS 2,646,019 A 7/1953 Chetlan
3,208,069 A 9/1965 Brueckmann
3,560,982 A * 2/1971 Fenwick .................. H01Q 1/30 343/843
3,715,754 A 2/1973 Parry
3,727,229 A 4/1973 Clinger
3,806,944 A * 4/1974 Bickel ...................... H01Q 1/30 343/722
3,829,861 A * 8/1974 Karaganis ................ H01Q 1/30 343/707
3,946,391 A 3/1976 Cuckler
4,051,479 A 9/1977 Altshuler
4,476,576 A * 10/1984 Wheeler .............. H01Q 1/1292 343/849
4,771,292 A * 9/1988 Beach ...................... H01Q 1/50 343/885
4,903,036 A * 2/1990 Wheeler .................. H01Q 1/28 343/849
4,962,488 A * 10/1990 Dell-Imagine ........... H04B 1/69 367/4
5,065,163 A 11/1991 Mears
5,530,445 A 6/1996 Veazey
5,838,275 A 11/1998 Carmi
5,969,660 A 10/1999 Veazey
6,195,039 B1 2/2001 Glass, Jr.
8,179,327 B1 5/2012 Clark
9,233,733 B2 1/2016 Bein et al.
9,407,000 B1 8/2016 Willistein
9,853,360 B2 12/2017 Sylvia
9,886,864 B1 * 2/2018 Chubb ...................... F03D 5/00
10,094,921 B2 * 10/2018 Duncan ............... G01S 13/9023
10,435,152 B1 * 10/2019 Cook ..................... B64U 10/60
11,394,126 B1 7/2022 White
11,513,536 B2 * 11/2022 Fischer ................ G05D 1/0866
11,539,119 B1 12/2022 Wall
2003/0000448 A1 1/2003 Kruger
2006/0231012 A1 10/2006 Wamester
2007/0123122 A1 5/2007 Puzella
2009/0269709 A1 10/2009 Fowler
2010/0008011 A1 1/2010 Ogram
2011/0011323 A1 1/2011 Wiggins
2011/0267241 A1 11/2011 Grimm
2012/0098714 A1 4/2012 Lin
2012/0105254 A1 * 5/2012 Ogram ................... B64D 47/06 340/815.45
2012/0118213 A1 5/2012 Wiggins
2014/0306057 A1 10/2014 Casse
2014/0361922 A1 * 12/2014 Duncan .................. G01S 13/90 342/25 A
2014/0361938 A1 12/2014 Duncan
2019/0061938 A1 * 2/2019 McCorkle ............. B64U 20/10
2020/0371187 A1 11/2020 Parsche
2022/0126961 A1 4/2022 Bergsrud
2022/0231417 A1 7/2022 Batel

OTHER PUBLICATIONS

From U.S. Appl. No. 16/863,789 (now U.S. Pat. No. 11,539,119), Office Action mailed on Apr. 25, 2022.

* cited by examiner

SLANTED TOP LOADED MONOPOLE FOR VLF GENERATION

CROSS REFERENCE TO RELATED APPLICATIONS

This application relates to and is a divisional application of U.S. patent application Ser. No. 16/863,789 filed on Apr. 30, 2020, which relates to and claims the benefit of priority from U.S. Provisional Patent Application 62/869,838, filed Jul. 2, 2019, which are incorporated herein by reference in their entireties.

STATEMENT REGARDING FEDERAL FUNDING

This invention was made under U.S. Government contract N66001-19-C-4018. The U.S. Government may have certain rights in this invention.

TECHNICAL FIELD

This disclosure relates to very low frequency (VLF) transmitters and antennas.

BACKGROUND

A typical application for a very low frequency (VLF) transmitter is command and control of submerged platforms. In the prior art a VLF transmitter is typically a large stationary monolithic structure. These prior art VLF transmitters are massive in size and require a large land area, and in addition have high operational costs.

A variety of other VLF transmitter architectures have been proposed and investigated. The most common type of VLF transmitter is a large ground based station, such as the Cutler station in Maine. Typically these VLF transmitters are constructed of one or more very large top-loaded monopole structures designed to couple energy into the earth-ionosphere waveguide (EIW) to provide VLF coverage over large sections of the earth.

Another prior art VLF transmitter architecture utilizes a long wire antenna trailing behind an airplane to achieve VLF transmission from a single mobile platform. The TACAMO system uses such a VLF transmitter.

Yet another prior art VLF transmitter architecture employs aerostats and consists of a ground based VLF source feeding a long conductor, which is supported by a lighter than air structure, such as an aerostat or a balloon. For example, U.S. Pat. No. 4,476,576, issued Oct. 9, 1984, and U.S. Pat. No. 4,903,036, issued Feb. 20, 1990, each describe prior art VLF communication systems, which utilize a cable connected to a deployed aerostat, which acts a tether and a VLF antenna. The cable is connected to an RF transmitter located on the ground. U.S. Pat. No. 4,903,036, issued Feb. 20, 1990, describes a tether having a length that is roughly one quarter of the desired electromagnetic wavelength.

Aerostat tethered antennas are very susceptible to environmental factors (e.g. wind gusts) and do not provide a method of correcting for these. An aerostat tethered antenna also has a disadvantage in that it does not provide any significant top loading method.

Another prior art VLF transmitter architecture strings a long conductor between two satellites to enable VLF/ELF (very low frequency/extremely low frequency) transmission from orbit, such as the NASA tethered satellite system (TSS).

While all of these prior systems are effective at generating VLF radiation, they each have relied on massive physical size to achieve efficient operation. These systems also do not provide a method of controlling VLF signal coverage.

Masts are used to hold antennas or sensors aloft in terrestrial applications, and on moving platforms, such as a ship. Mast motion can result in signal degradation. To counteract large surface vehicle motions or rotations associated with high sea state waves and winds, U.S. Pat. No. 9,233,733, issued Jan. 12, 2016, describes a mast stabilizing device that uses a mass at the bottom of the mast, in the water, and a spring attached to a buoy to act as a spring-mass-damper system to limit mast motions and to help the mast maintain a substantially vertical orientation desired in vertical antenna applications.

What is needed is an improved VLF transmitter that is significantly smaller and more mobile, and that allows control of the VLF signal coverage. The embodiments of the present disclosure answer these and other needs.

SUMMARY

In a first embodiment disclosed herein, a system for an antenna for very low frequency communication comprises a surface platform that is configured to move on a surface, a first conductive cable having a first end coupled to the surface platform, wherein the first conductive cable is electrically conductive, and an aerial platform coupled to a second end of the first conductive cable, wherein the aerial platform comprises an electrically conductive portion electrically coupled to the first conductive cable, wherein the aerial platform is configured so that as the surface platform moves on the surface the aerial platform is towed and has an elevation above the surface.

In another embodiment disclosed herein, a system for an antenna for very low frequency communication comprises a surface platform that is configured to maintain a position on a surface, a first conductive cable having a first end coupled to the surface platform, wherein the first conductive cable is electrically conductive, and an aerial platform coupled to a second end of the first conductive cable, wherein the aerial platform comprises an electrically conductive portion electrically coupled to the first conductive cable, wherein the aerial platform flies in an orbital path about the surface platform.

In yet another embodiment disclosed herein, a method for providing an antenna for a very low frequency communication system comprises providing a surface platform that is configured to move on a surface, providing a first conductive cable having a first end coupled to the surface platform, wherein the first conductive cable is electrically conductive, and providing an aerial platform coupled to a second end of the first conductive cable, wherein the aerial platform comprises an electrically conductive portion electrically coupled to the first conductive cable, wherein the aerial platform is configured so that as the surface platform moves on the surface the aerial platform is towed and has an elevation above the surface, or providing a surface platform that is configured to maintain a position on a surface, providing a first conductive cable having a first end coupled to the surface platform, wherein the first conductive cable is electrically conductive, and providing an aerial platform coupled to a second end of the first conductive cable, wherein the aerial platform comprises an electrically conductive portion electrically coupled to the first conductive cable, wherein the aerial platform flies in an orbital path about the surface platform.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Conventional VLF transmitters used for command and control of submerged platforms are large stationary monolithic structures, requiring massive size, land area, and operational costs to achieve their mission. This invention seeks to enable a significantly smaller and more mobile VLF transmitter design by employing a dynamic slanted monopole transmitter implemented using an airborne vehicle electrically and physically tethered to a surface maritime vessel. This catenary arrangement for the antenna is important for strain and snap load relief to accommodate relative motion between the two vehicles and maintain aerial support for the conductive tether in challenging environmental conditions. The strain and snap load relief is provided by the lateral positioning of the vehicles, and helps accommodate challenging environmental conditions, such as in the open ocean, which can include gusting winds and large surface vehicle motions or rotations associated with high sea state waves.

Unlike the prior art which has used lighter than air vehicles, the present invention employs airborne vehicles utilizing aerodynamic forces to maintain altitude, and because of this, the disclosed invention is able to persist longer due to the fact that it does not require replenishment of lighter than air gases. This invention also provides a method of reducing the required size of the antenna by trailing conductive wires behind the airborne vehicle allowing the total system height to be smaller than that of prior art aerostat based designs. Finally, this invention provides a method of supplying power and control signals to the airborne platform to further increase system persistence.

The invention also provides a mechanism for adjusting the slant angle between the airborne and surface vehicles allowing for improved robustness in adverse open ocean conditions. One mechanism for adjusting the slant angle between the airborne vehicle and the ground vehicle is to measure the input impedance of the monopole antenna. At the surface vehicle, the input impedance of the monopole can be measured by observing the current and voltage. When the input impedance spikes, for example due to adverse weather, this is an indication that the slant angle has increased, which is not optimal. Given this indication, controls may be sent by the system to adjust the surface vehicle and/or air vehicle motion to decrease the slant angle for better performance.

Figure 1:
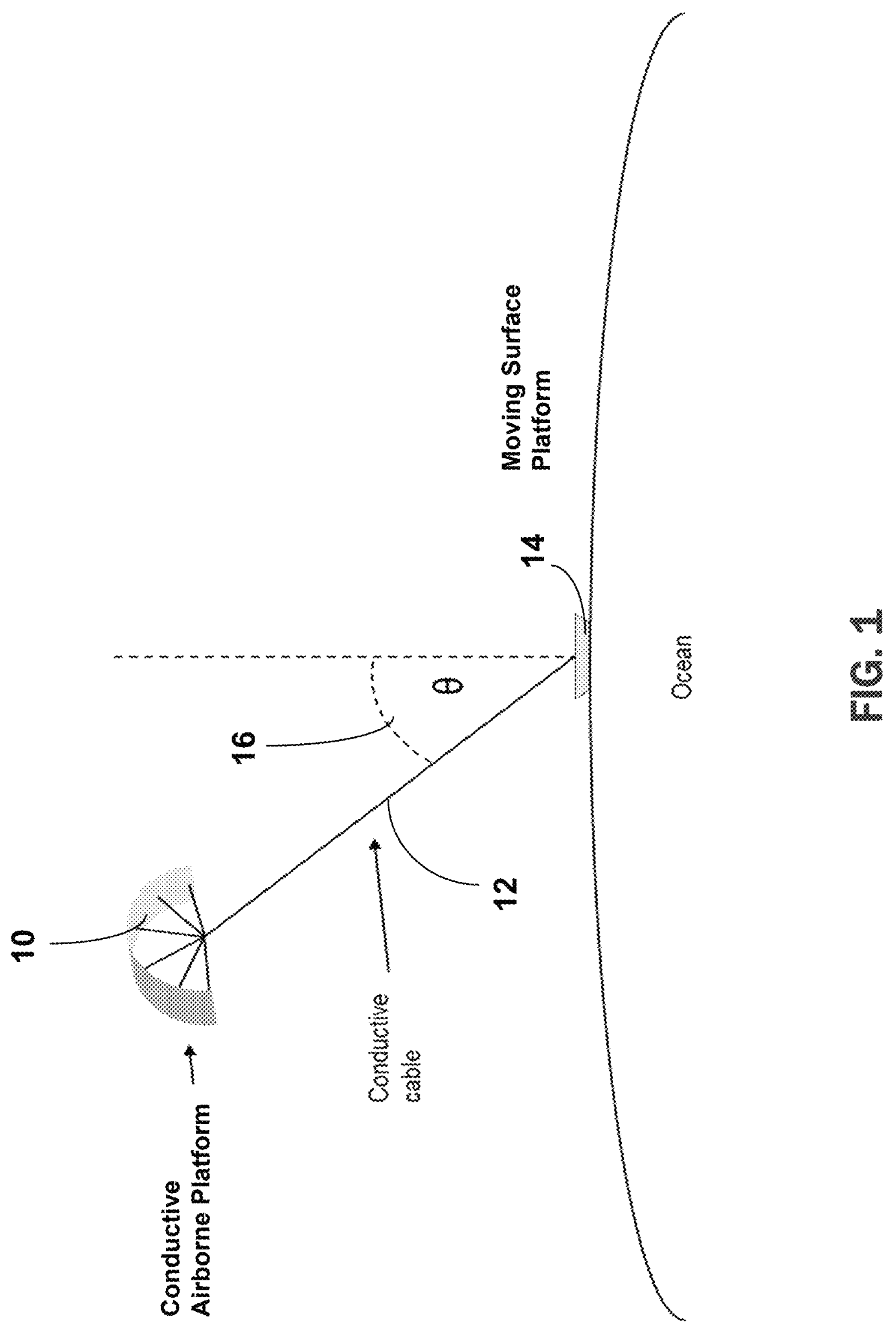
FIG. 1 shows a conductive airborne platform, such as a kite or sail, with a conductive cable connected to a moving surface platform, such as a boat, in accordance with the present disclosure.

In one preferred embodiment, as shown in FIG. 1, the airborne platform consists of an electrically conductive airborne platform 10, which can be a kite or a parasail, made of lightweight conductive fabric, such as aluminum foil or mylar with a aluminum or copper coating. An electrically conductive cable 12 connects the airborne platform 10 to a moving surface platform 14, which may be a boat, ship, maritime drone or other maritime moving platform, and may be moving surface platform on land, such as vehicle or a train car on a railroad track. The conductive cable may be surrounded by a protective sheath, which may be configured to: prevent corrosion due to exposure to sea water; limit wear due to friction during spooling to deploy or retrieve the airborne platform 10; and to increase mechanical strength to prevent breaking under tension.

The airborne platform 10 is designed to support the conductive cable at a height sufficient to allow for adequate radio frequency (RF) radiation and to increase the capacitance of the antenna by acting as a top loading structure. The lift required to support the cable at altitude is created by the aerodynamic design of the kite or parasail 10, combined with the lateral force imparted on it by the moving surface platform 14 through the conductive cable 12. The conductive cable 12 acts both as a slanted monopole antenna and as a tow cable to pull the airborne platform 10 allowing it to achieve lift. The lift required is equal to the weight of the cable plus the weight of the vehicle. Preferably, the system should maintain a lift margin budget of 25% to account for the overhead of mitigating environmental forces.

Unlike a conventional monopole antenna which is oriented at a 90 degree angle relative to a ground plane, the monopole antenna created by conductive cable 12 between the airborne platform 10 and the moving surface platform 14, as shown in FIG. 1, is slanted at an angle θ 16 relative to the surface normal. This slant angle 16 reduces the radiation from the antenna 12, so a small slant angle 16 is desired to maximize radiation resistance. Further, the conductive cable 12 because it is supported only at its ends may have a catenary curve shape.

Figure 2:
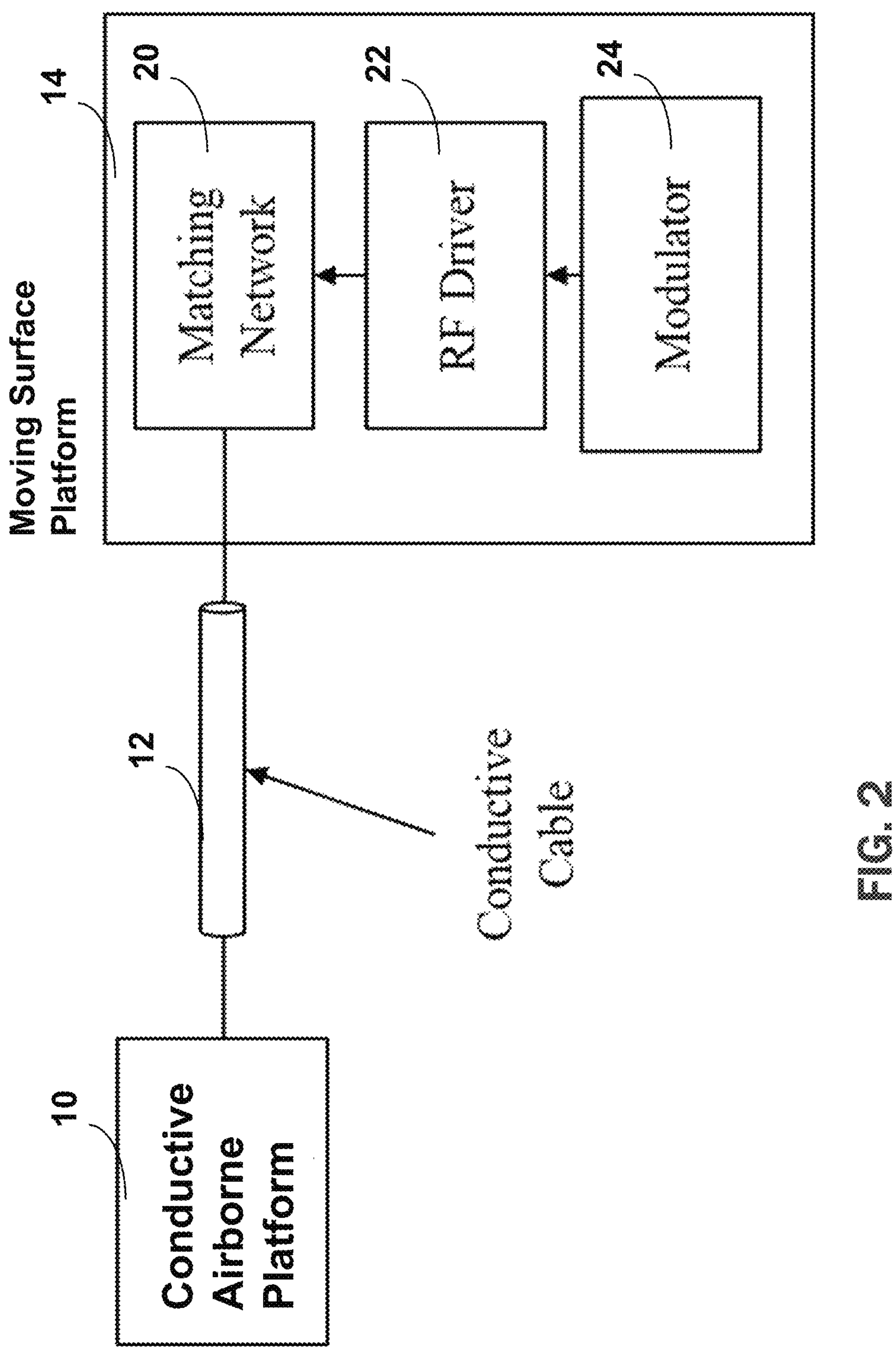
FIG. 2 shows a block diagram showing major subsystems within the surface platform of FIG. 1 in accordance with the present disclosure.

At the surface platform 14, the conductive cable 12 may be electrically connected to a matching network 20, RF driver 22, and modulator 24, as shown in FIG. 2. The matching network 20, RF driver 22, and modulator 24 create currents on the conductive cable antenna 12 which then radiates modulated VLF waves.

Figure 3:
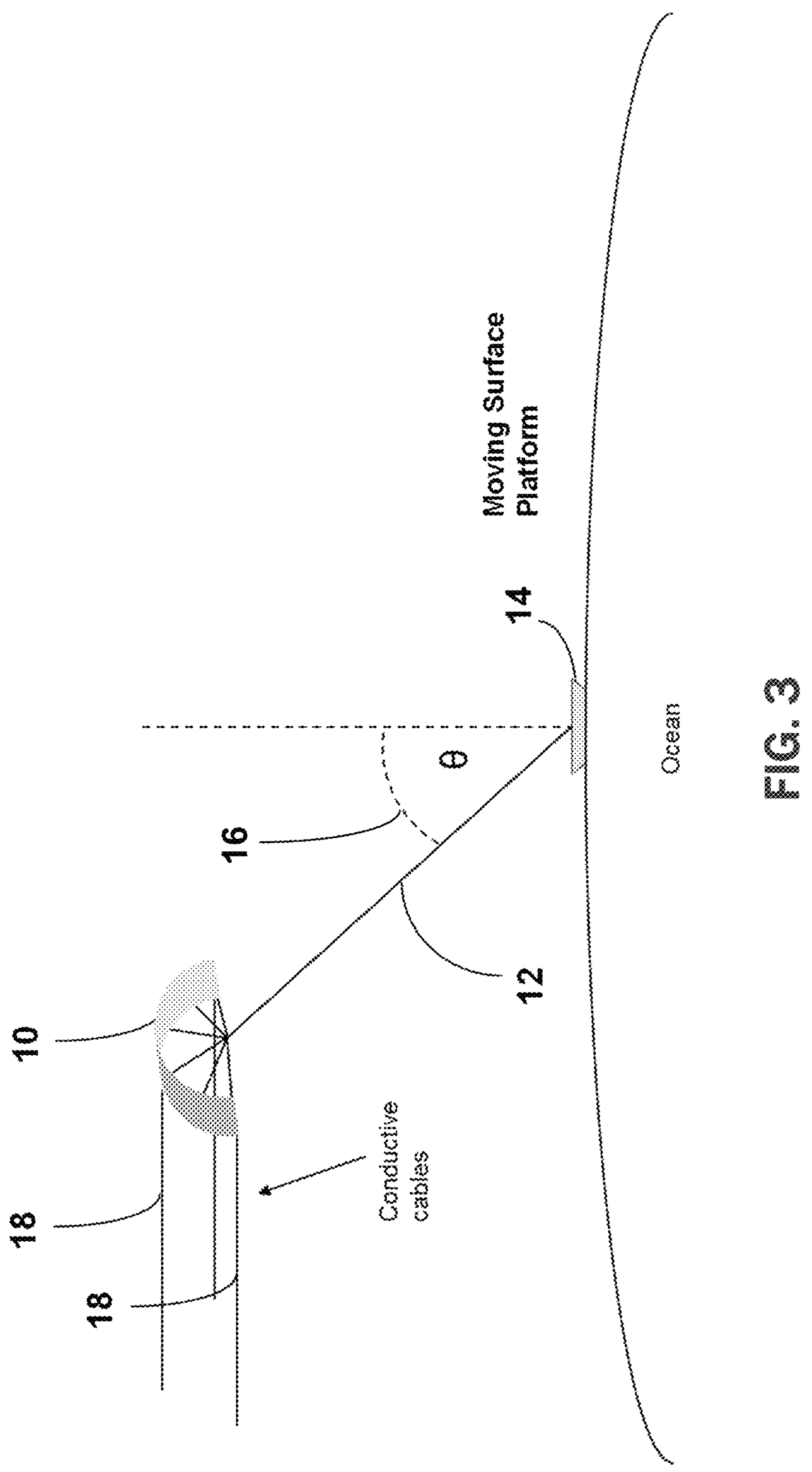
FIG. 3 shows a variation on the embodiment shown in FIG. 1 in which one or more conductive cables are trailed behind the conductive airborne platform to increase the top-end capacitance to ground of the antenna and allow it to operate efficiently at smaller sizes in accordance with the present disclosure.

In a variation on this embodiment, one or more conductive cables 18 may be connected to the airborne platform 10 and trail behind the airborne platform 10 when the surface platform is moving, as shown in FIG. 3. The trailing cables 18 increase the capacitance of the conductive cable antenna 12 and allow the height of the kite or parasail 10 to be reduced without reducing the efficiency of the conductive cable antenna 12.

With the conductive cables 18 the antenna looks like an inverted L antenna over a conducting ground plane of conductivity equal to that of sea water. With this model, equations for an inverted L antenna can be used to estimate the input impedance of the antenna. The height of the antenna and length of the trailing conductive cable can then be adjusted until the desired input impedance is achieve, meaning one commensurate with the matching/drive network. This method is approximate and does not take into account other effects such as a non-normal orientation of the tether or the true conductivity of the sea.

To first order the trailing wires add a capacitance equal to a wire capacitor over a ground plane, to the total input reactance of the antenna. For very long trailing wire antennas, this is the dominant term in the input reactance of the antenna and can be approximately assumed to equal the antenna reactance. In this scenario the tether height can then be reduced until the voltage on the antenna required to achieve the desired radiated power exceeds the breakdown limit and/or generates substantial coronal effects.

Figure 4:
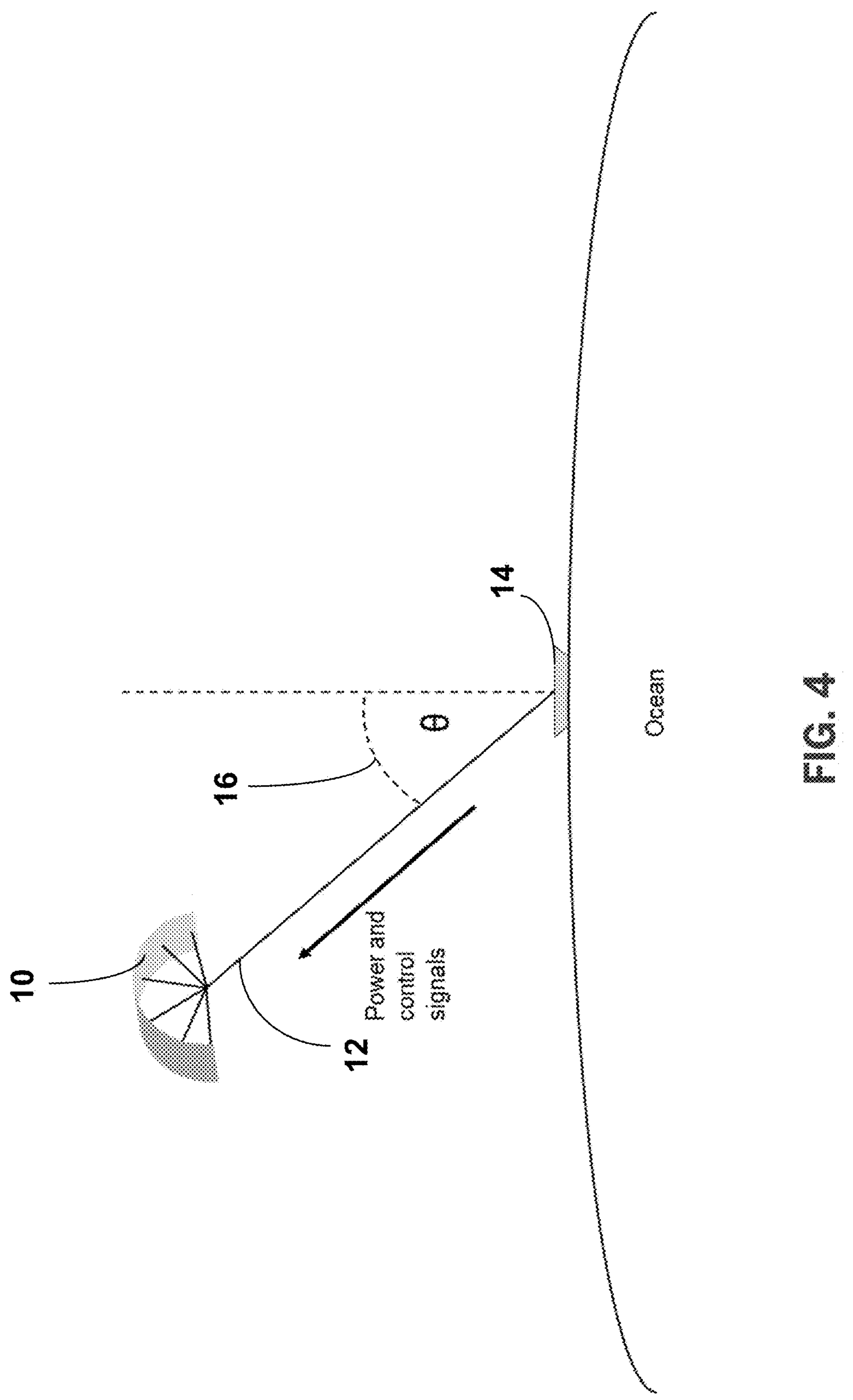
FIG. 4 shows a variation on the embodiment shown in FIG. 1 in which power and control signals are transmitted along the conductive cable to the airborne platform in accordance with the present disclosure.

The kite or parasail 10 may further include other electronic subsystems as further described with reference to FIG. 9 below. FIG. 4 shows the conductive cable 12 may be configured to transmit power and control signals from the surface platform 14 to the airborne platform 10 along the conductive cable 12.

Figure 5:
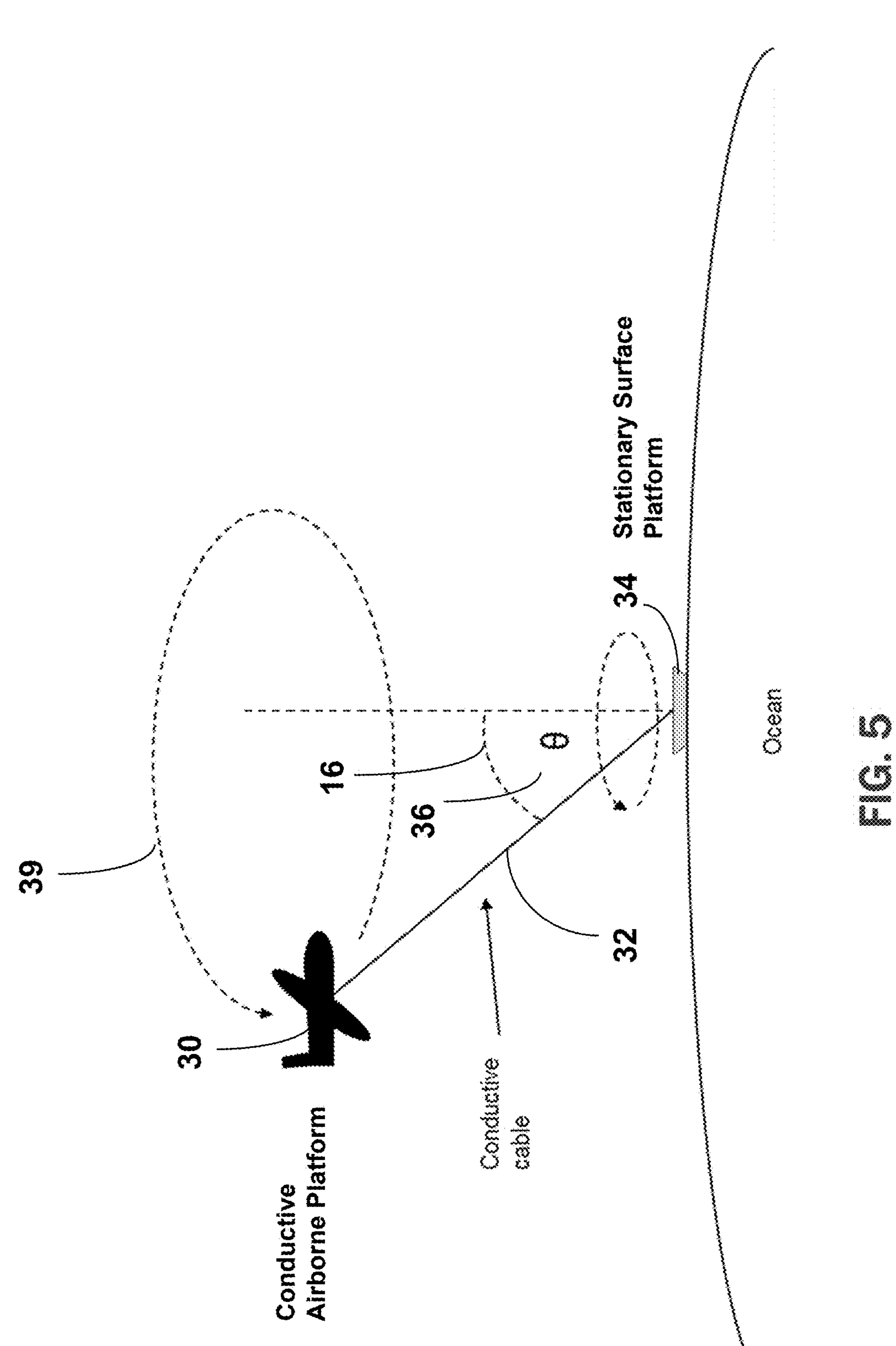
FIG. 5 shows an airborne platform, such as an airplane or a glider, tethered by a conductive cable to a stationary surface platform, such as a buoy or barge, in accordance with the present disclosure.

In a second embodiment the airborne platform 30 may be a plane, drone or glider 30, as shown in FIG. 5. The airborne platform 30 preferably is made of a lightweight conductive material, such as aluminum, or has a skin that is a lightweight conductive material. A conductive cable 32 connects the airborne platform 30 to the surface platform 34. As described above for conductive cable 12, the conductive cable 32 may be surrounded by a protective sheath intended to: prevent corrosion due to exposure sea water; limit wear due to friction during the spooling process to deploy or retrieve the airborne platform 30; and provide additional mechanical strength to prevent breaking under tension. The airborne platform 30 is designed to support the conductive cable at a height sufficient to allow for adequate VLF radiation and increase the capacitance of the antenna by acting as a top loading structure.

The lift required to support the cable 32 at altitude is created by the aerodynamic design of the plane or glider 30 as well as its movement through the air. Unlike the embodiment shown in FIGS. 1, 3 and 4, the airborne platform 30 in this embodiment flies in an orbital path 39 around the surface platform 34, which remains relatively stationary.

The orbit of the airborne platform 30 preferably has a limited orbital radius relative to a normal from the surface platform 34. Therefore, the monopole antenna created by the conductive cable 32 between the airborne platform 30 and the stationary surface platform 34, as shown in FIG. 5, is slanted at an angle θ 36 relative to the surface normal from the surface platform 34. This slant reduces the RF radiation from the antenna, so it is desirable to reduce the slant angle as much as possible to maximize radiation resistance.

Figure 6:
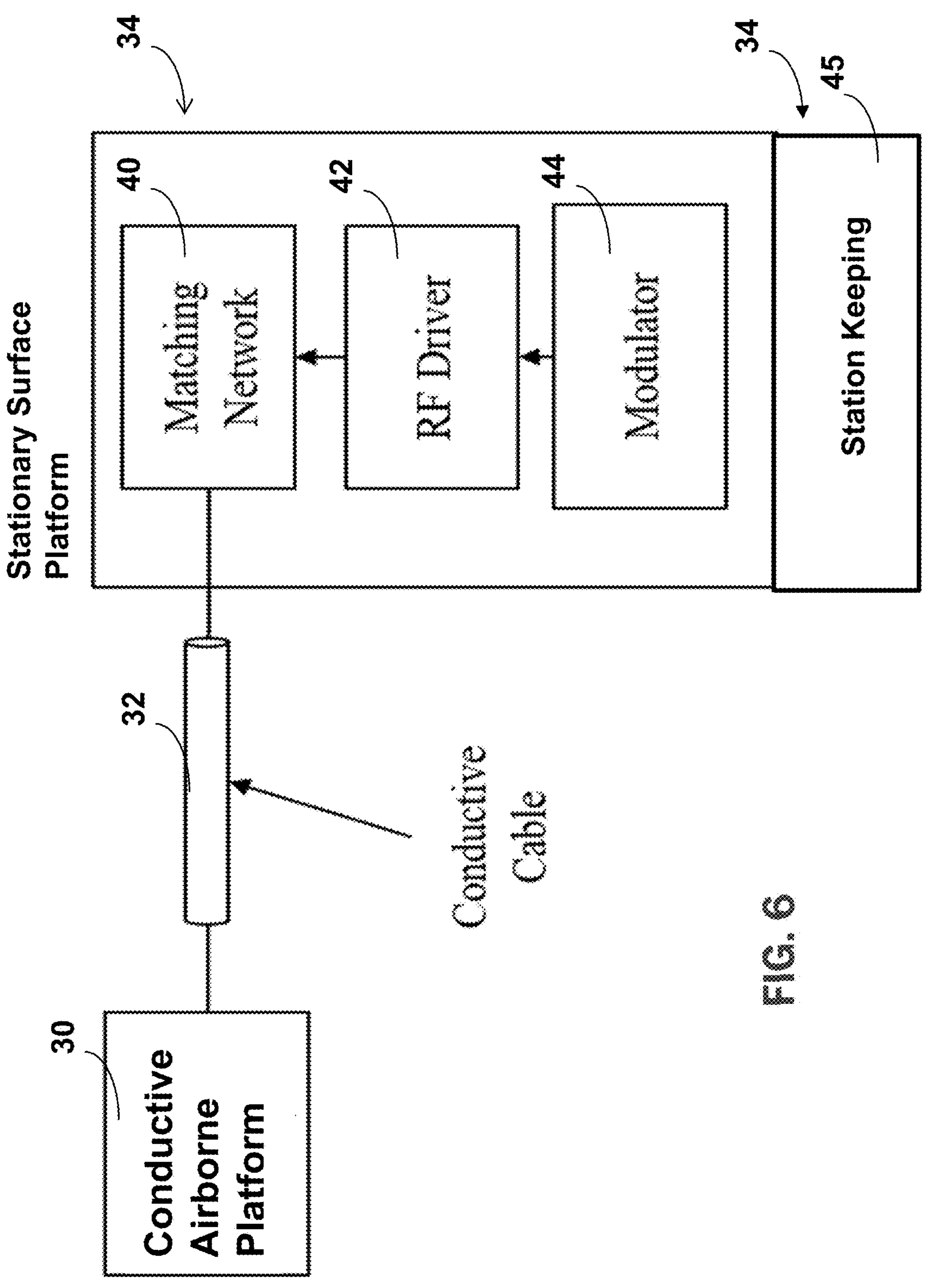
FIG. 6 shows a block diagram showing major subsystems within the surface platform of FIG. 5 in accordance with the present disclosure.

At the surface vessel 34, the conductive cable 32 may be electrically connected to a VLF transmitter, which can include a matching network 40, an RF driver 42, and a modulator 44, as shown in FIG. 6. The matching network 40, RF driver 42, and modulator 44 create currents on the antenna 32 which then radiates modulated VLF waves.

Also as shown in FIG. 6, the surface platform 34 can include station keeping system 45 for keeping the surface platform relatively stationary.

Figure 7:
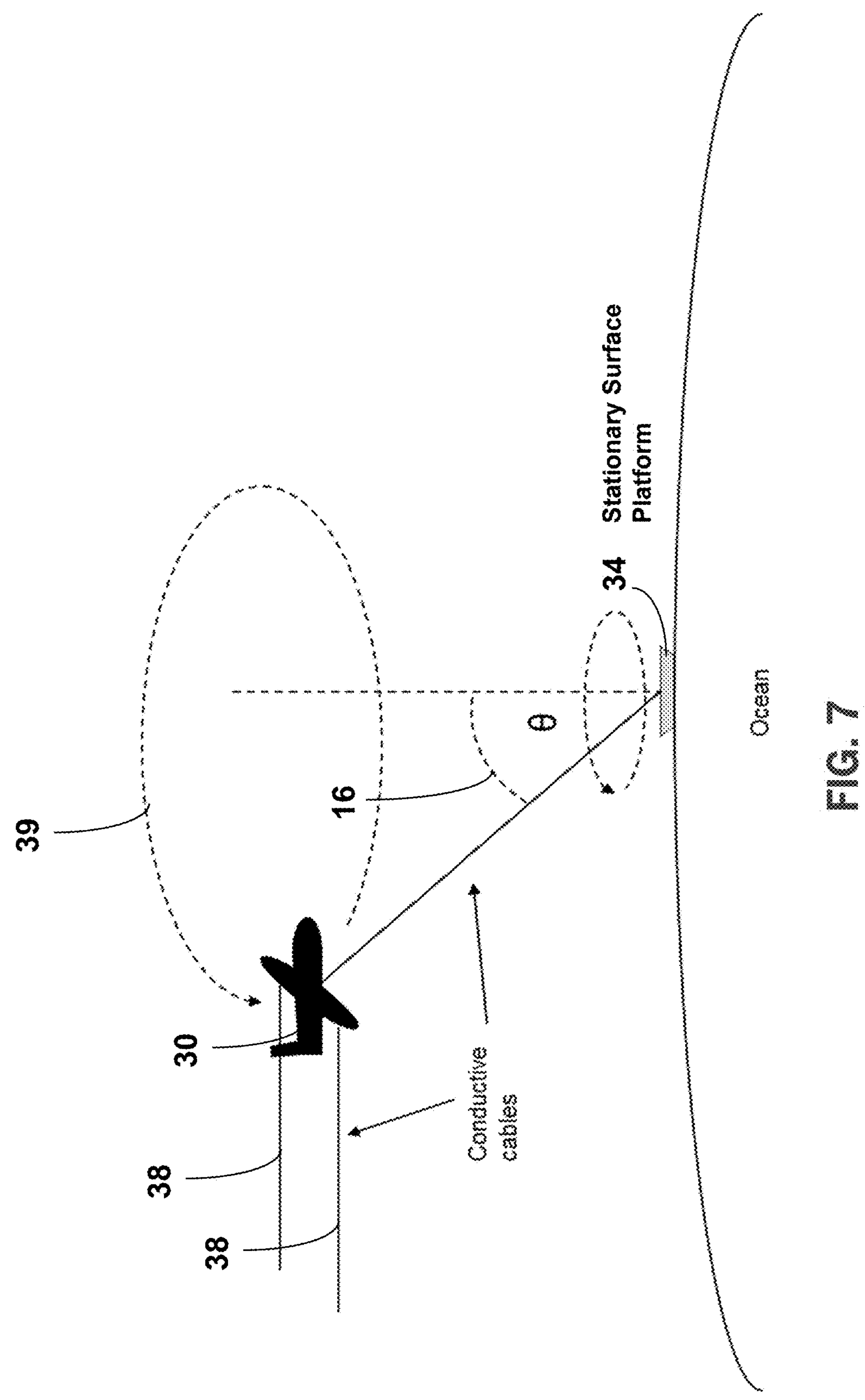
FIG. 7 shows one or more conductive cables trailed behind the airborne platform of FIG. 5 to increase the top-end capacitance to ground of the antenna and allow it to operate efficiently at smaller sizes in accordance with the present disclosure.

In a variation on this embodiment, one or more conductive cables 38 may be connected to the airborne platform 30 and trailed behind the airborne platform 30 as the airborne platform 30 flies around the orbital path 39, as shown in FIG. 7. The trailing cables 38 increase the capacitance of the antenna 32 and allow the height of the airborne platform 30 to be reduced without reducing the efficiency of the antenna 32.

Figure 8:
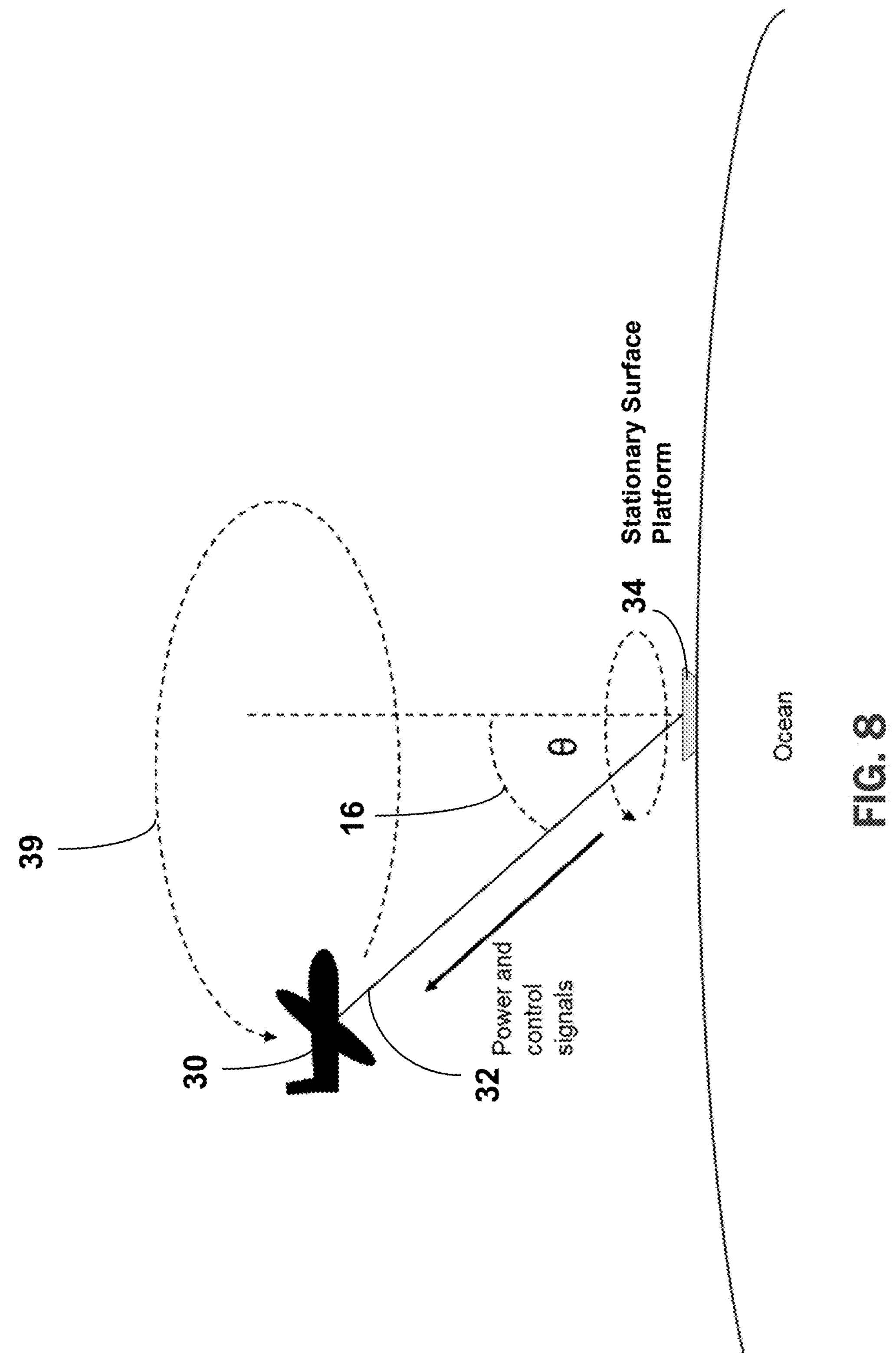
FIG. 8 shows power and control signals transmitted along the conductive cable in order to support and command of the airborne platform of FIG. 5 in accordance with the present disclosure.

As shown in FIG. 8, power and control signals may be transmitted from the surface platform 34 along the conductive cable 32 to the airborne platform 30.

Figure 9:
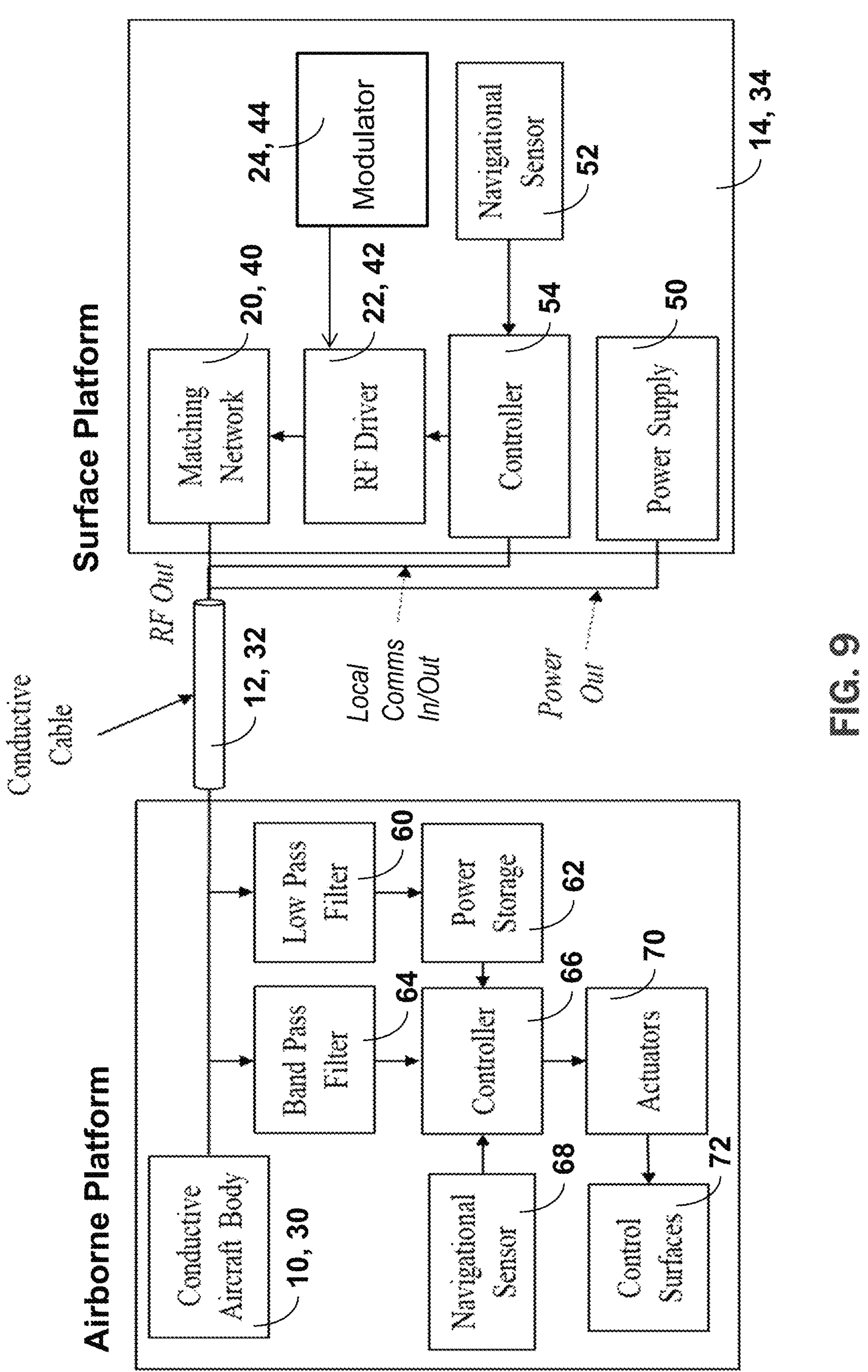
FIG. 9 shows a block diagram showing subsystems that can be used in the airborne platforms and the surface platforms of FIGS. 1, 3, 4, 5, 7 and 8 in accordance with the present disclosure.

FIG. 9 shows further subsystems that may be included in the airborne platforms 10 or 30 and surface platforms 14 and 34.

The surface platform 14 or 34 may be equipped with a power supply 50, which may include a battery, an electric generator, and/or solar cells. Direct current (DC) or alternating current (AC) power signals generated from the power supply 50 may be transmitted along the conductive cable 12 or 32, filtered at the airborne platform 10 or 30 via a low pass filter 60 and stored on a power storage device 62, such as a battery, to power various subsystems on the airborne platform 10 or 30. By supplying power from the surface platform 14 or 34 to the airborne platform 10 or 30, the weight of the airborne platform 10 or 30 can be reduced improving flight performance and duration.

As shown in FIG. 9, the surface platform 14 or 34 may be equipped with a navigational sensor 52 which measures the absolute position of the surface platform and provides that information to a controller 54, which in turn generates a low frequency data signal which may be transmitted along the conductive cable 12 or 32 and filtered by a bandpass filter 64 on the airborne platform 10 or 30 and sent to a controller 66 located on the airborne platform 10 or 30. Using information provided by navigational sensor 68 located on the airborne platform 10 or 30, the controller 66 on the airborne platform 10 or 30 may compute the difference between the estimated positions of the surface platform and the airborne platform and send controls to actuators 70 to adjust control surfaces 72 of the airborne platform to minimize θ 16 while maintaining altitude.

In the case of the airborne platform 10, the surface platform can also adjust its speed or direction based on navigation information sent from navigation sensor 68 on the airborne platform 10 to the controller 54 on the surface platform 30. The controller 54 can use the information received from the navigation sensor 68 and the navigation sensor 52 to keep the surface platform 14 moving at a speed and in a direction to keep the kite or parasail 10 aloft and at a desired slant angle 16. This feedback loop also allows this system to constantly correct for variations in the environment such as wind and sea motion, making it more robust to adverse weather and sea state.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A system for an antenna for very low frequency communication comprising:
- a surface platform that is configured to maintain a position on a surface, the surface platform comprising a VLF transmitter;
- a first conductive cable having a first end coupled to the VLF transmitter of the surface platform, wherein the first conductive cable is electrically conductive; and
- an aerial platform coupled to a second end of the first conductive cable, such that the first conductive cable forms, between the VLF transmitter of the surface platform and the aerial platform, a VLF monopole antenna arranged to be driven by the VLF transmitter, the VLF monopole antenna having a first top-end capacitance over said surface, wherein the aerial platform comprises one or more second electrically conductive cables configured to trail from the aerial platform and electrically coupled to the first conductive cable to increase said first top-end capacitance;
- wherein the aerial platform flies in an orbital path about the surface platform.

2. The system of claim 1:
- wherein the aerial platform comprises an aero plane, an airplane, a glider, or a drone; and
- wherein the surface platform comprises a marine vessel, a boat, a ship, a barge, or a land vehicle.

3. The very low frequency communication system of claim 1:
- wherein the surface platform comprises a station keeping device.

4. The system of claim 1 wherein the surface platform VLF transmitter comprising:
- a modulator;
- an radio frequency driver coupled to the modulator; and
- a matching network coupled to the radio frequency driver and electrically coupled to the first end of the first conductive cable.

5. The system of claim 1:
- wherein the surface platform further comprises:
- a first controller coupled to the first conductive cable; and
- a first navigational sensor coupled to the first controller;
- wherein the aerial platform further comprises:
- a second controller coupled to the first conductive cable;
- a second navigational sensor coupled to the second controller; and
- wherein the first controller is configured to use navigation information from the first navigation sensor and the second navigation sensor to control a position of the surface platform and to control flight of the aerial platform.

6. The system of claim 5:
- wherein the surface platform further comprises:
- a power supply coupled to the first conductive cable for supplying power to the aerial platform; and
- wherein the aerial platform further comprises;
- a low pass filter for filtering power from the first conductive cable to power the second navigational sensor and the second controller.

7. The system of claim 6: wherein the aerial platform further comprises:
- a power storage device coupled to the low pass filter.

8. The system of claim 5: wherein the aerial platform further comprises:
- a band pass filter coupled to the first conductive cable for filtering controls on the first conductive cable for the second navigational sensor and the second controller.

9. The system of claim 5:
- wherein the aerial platform further comprises:
- one or more actuators coupled to the second controller; and
- control surfaces coupled to the actuators for position control of the aerial platform.

* * * * *